United States Patent Office.

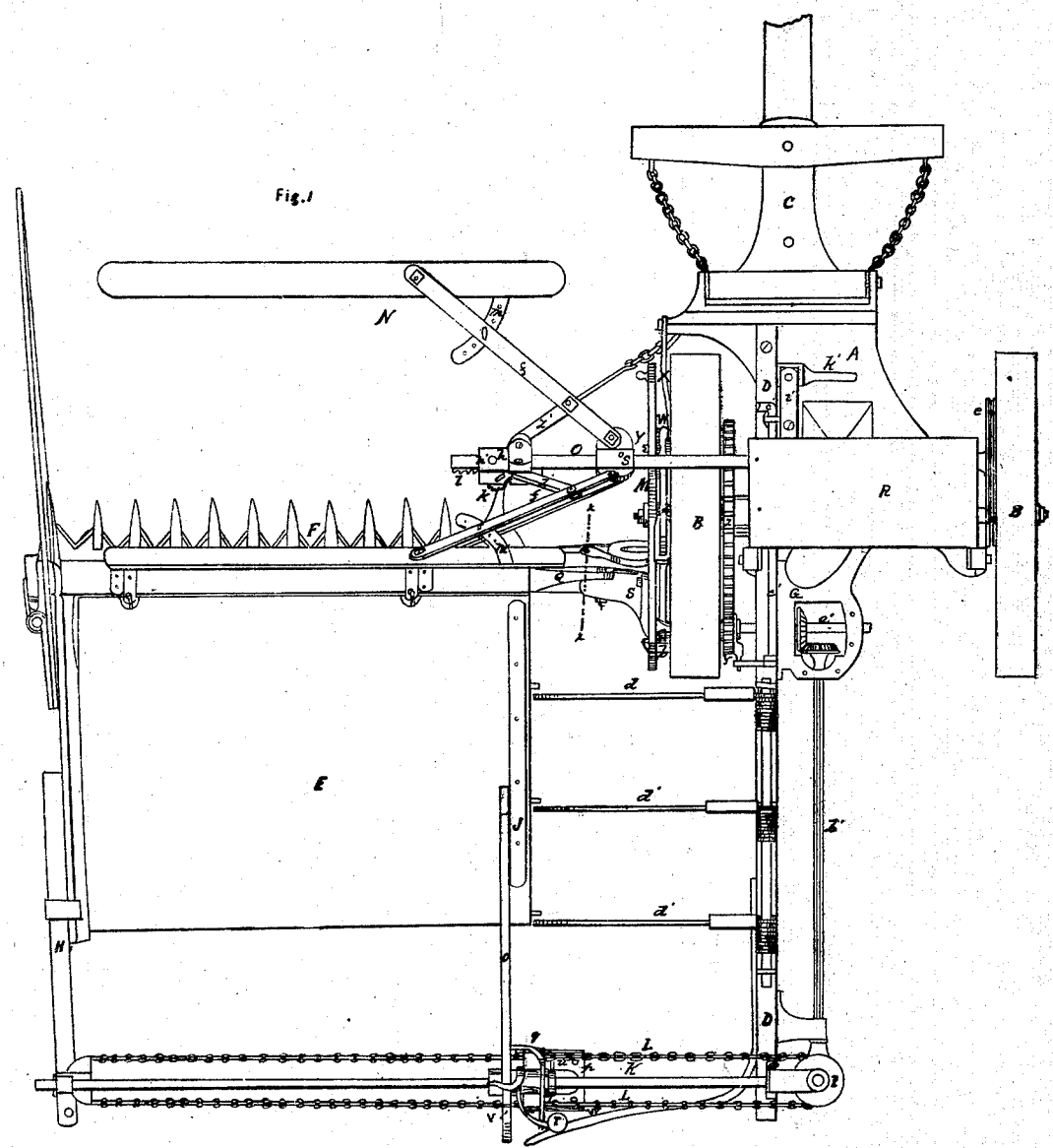

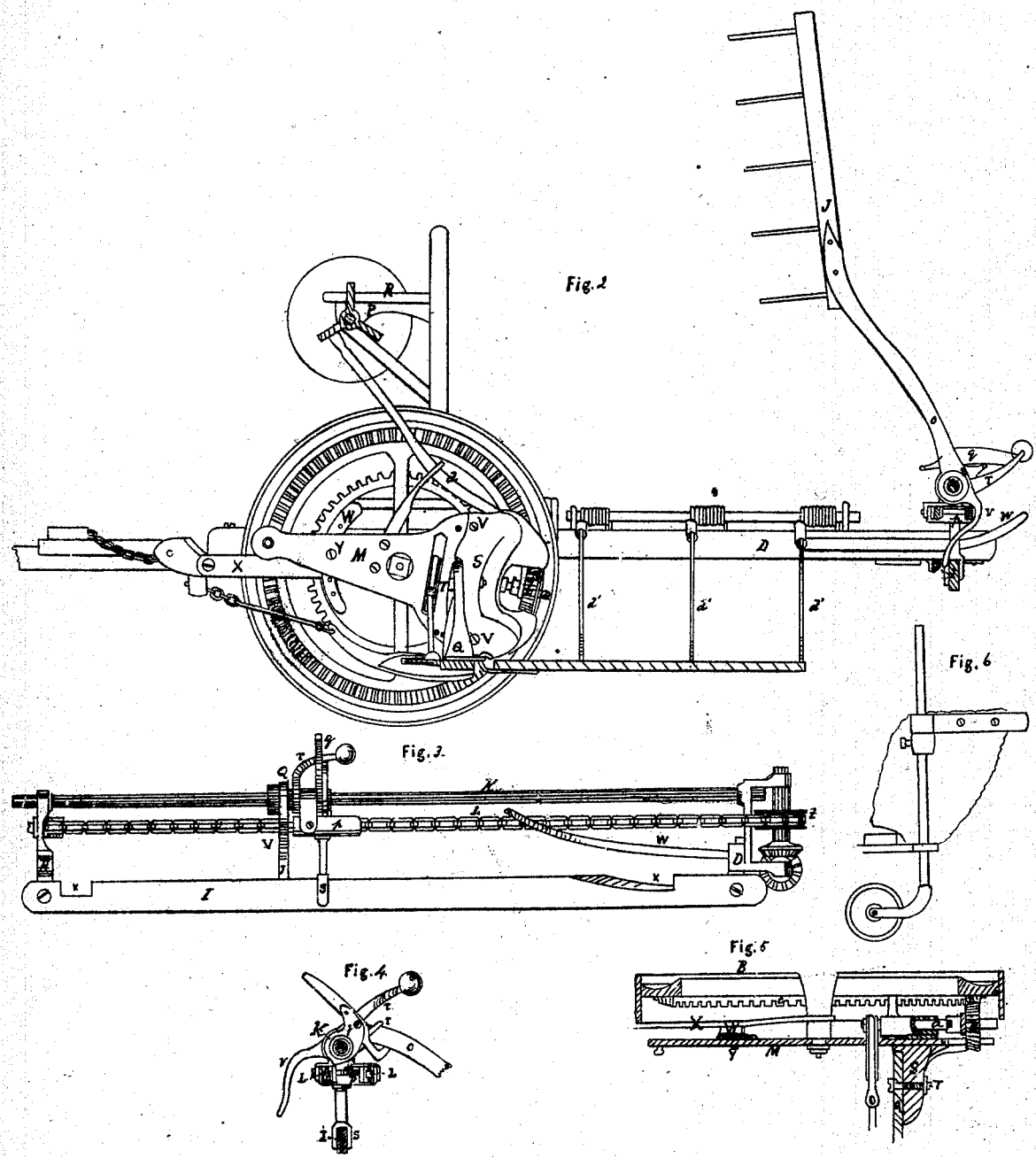

CHARLES G. MILLER, OF SPRINGFIELD, OHIO.

Letters Patent No. 68,775, dated September 10, 1867.

---

IMPROVEMENT IN HARVESTERS.

---

The Schedule referred to in these Letters Patent and making part of the same.

---

TO ALL WHOM IT MAY CONCERN:

Be it known that I, CHARLES G. MILLER, of Springfield, in the county of Clark, and State of Ohio, have invented a new and useful Improvement in Harvesters; and I do hereby declare the following to be a full, clear, and exact description of the same, reference being had to the accompanying drawings, in which—

Figure 1 is a plan view of my machine.
Figure 2 is an elevation of the inner side of the frame on the line $x\ x$ of fig. 1.
Figure 3 is a rear elevation of the rake-guide and frame.
Figure 4 is a transverse sectional elevation of the same.
Figure 5 is a horizontal section of the inner driving-wheel and connections.
Figure 6 is an elevation of the outer end of the platform.
Figure 7 is a sectional elevation of the attachment of the tongue.

That others may understand the construction and operation of my invention, I will particularly describe it.

The main frame A is made of cast iron, and is mounted upon the axle of the main wheels B B which passes beneath said frame, and is secured thereto by suitable boxes, which are not shown in the drawings. The tongue C is secured to the front end of this frame by a hinge joint, and may be rendered flexible or rigid at will by key and stop. A beam, D, is secured by bolts to the upper side of the frame A, and projects backward therefrom beyond the rear edge of the platform E, upon which the grain falls as it is severed by the cutters F. The frame G is also secured to the rear edge of the frame A, though, if desirable, it may be cast as a part of said frame. To the outer side of the platform is secured the beam H, which projects backward until its rear end is opposite the rear end of the beam D; and connecting the rear ends of the beams D and H is the strip I, which not only maintains the said beams in proper position in regard to each other, but it forms a part of the guide-frame of the rake J, which moves back and forth across the platform from side to side, sweeping the grain sideways therefrom, so as to leave a clear space for the team at the next round. The rake-head moves back and forth upon the guide-rod K, and is actuated by the endless open-link chain L, the rake-head being connected to said chain, first on one part, and then the other, as it reaches one or the other end of its stroke. The plate M is centred upon the end of the main axle, and to it are attached the cutting apparatus, the crank-shaft, and the driving-pinion in such a way that while the horizontality of the main frame is unchanged the angle of the cutters to the ground may be changed, and they may be adjusted to cut either high or low, and the outer end of the cutting apparatus may rise and fall with the undulations of the ground over which the machine is being drawn. The reel N is mounted upon the reel-shaft O, which has its bearings in the brackets P P, upon which the driver's seat R also rests. Motion to the various parts of the machinery is communicated from the bearing-wheels B B.

Having now indicated in general terms the features of my machine, I will particularly describe such of its parts as may be necessary to obtain a clear understanding of my invention.

The cutting apparatus is attached to the plate M through the medium of the arm Q, which is rigidly attached to the inner shoe and the adjustable block S. The arm Q is pivoted to the block S by the bolt T, and upon this bolt, as a centre, the outer end of the cutting apparatus may rise and fall with the undulations of the ground over which it is drawn. The block S is secured to the plate M by two screw-bolts, U V, or their equivalents. The bolts U V are adjustable by shifting into different ones of the series of holes in the plate M, so as to shift either the top or the bottom of the block S forward or backward, giving the points of the guard-fingers a greater or less inclination to the surface of the ground, as may be desired. Graduations are marked upon the upper edge of the plate M for the purpose of facilitating this adjustment of the block S. If deemed preferable, the bolt V may pass through a slot in the plate M. In front of the axes of the main wheels is an arc, W, secured to the steady-bar X, which supports the outer end of the main axle against the lateral strains of the operations of the cutting apparatus. The plate M is clamped to the arc W at any desired point by the screw-bolt Y, and the cutting apparatus is thus raised or lowered to cause the cutters to operate far from or near to the surface of the ground. The outer end of the cutting apparatus is supported by an adjustable caster grain-wheel, constructed and adjusted with a movable collar, which is fitted to and clamped upon the shank of the wheel-arm at any point, as shown in fig. 6. The platform is rectangular, and is connected to the finger-bar by hooks or other convenient means. The front end of the inner shoe is connected to the front end of the main frame A by a rod and screw connection, so that its length may be regulated by said screw to correspond with the position of the cutting apparatus in respect to the ground. The cutter's crank-shaft $a$ is secured by suitable bearings to the inner side of the plate M. Its axis is parallel with the surface of said plate, and at its front end is a crank or eccentric to operate the cutter's pitman, and at its rear end a pinion, $b$, which is driven by a geared ring, $c$, upon the outer side of the bearing-wheel nearest the cutting apparatus. By this arrangement of parts I am enabled to use a very short crank-shaft, to drive it directly from the driving-wheel, and to place my cutting apparatus opposite the centre of my bearing-wheels. The pinion $b$ is loose upon the shaft $a$, but is provided with a clutch-pin, to which it is brought by the clutch-lever $d$. When the pinion $b$ is thrown out of connection with the shaft $a$ it is also out of gear with the gear-ring $c$.

The reel belongs to the class known as overhung, and open-head. Its shaft O is provided with a pulley, $e$, over which and a corresponding pulley on the main shaft a band is placed, which communicates motion from the main wheel to the reel. My reel is so constructed that it may be expanded or contracted, as may be found desirable, so as to sweep nearer or further from the cutting apparatus. This is effected by the following devices: The arms $fff$ are pivoted at one end to the fixed head $g$, and at the other end to blades N of the reel. The head $g$ is fixed upon the reel-shaft at some distance from the end thereof, and the movable head $h$ is placed near to the end of the shaft. The head $h$ is connected to the arms $ff$ by the short arms $iii$, so that, as the head $h$ is drawn nearer to or further from the end of the shaft O, the arms $ff$ will be correspondingly affected; and this movement of the head $h$ is effected and controlled by a small pinion, $k$, set in the said head, and a rack, $l$, secured to the shaft, as clearly shown in fig. 1. The segments $m$ serve to secure the adjustment of the blades of the reel N parallel with each other, and the set-screw $n$ secures the head $h$ against any movement not desired by the attendant.

The rake is a reciprocating rake, moving in a line parallel with the finger-bar, and sweeping the grain sideways from the platform. The rake-arm $o$ is hung upon the travelling-carriage $p$, which moves back and forth upon the rod K and bar I. That part of the carriage $p$ through which the rod K passes is formed with a hub at each end, upon which are fitted a shifter, $q$, and a weighted lever, $r$, and the rake-arm $o$. Below the carriage $p$ is the forked standard $s$, which rides upon the bar I, and over the upper surface, but confined between the perpendicular walls of the said carriage, passes the endless chain L, which is moved by the spur-wheel $t$ at the rear end of the timber D. The chain L moves the carriage $p$ and the rake J back and forth in its reciprocations in the following manner: Between the parts of the chain L where it passes over the carriage $p$ is the sliding-latch $u$, which is pointed at both ends, and engages with the links of the chain L on whichever side it is thrown. The shifter $q$ is provided with a point, which is inserted in a hole in the upper surface of this latch, and two arms, one of which is bent so as to project underneath the rake-arm $o$, and be depressed thereby when the rake drops upon the platform. This depression causes the latch to engage with that part of the chain which is furthest to the rear, and the carriage $p$ immediately commences to move toward the side of the platform nearest the main frame. The other arm of the shifter projects horizontally backward, and is depressed by the falling of the weighted lever $r$ upon it, so that the latch $u$ then engages with the opposite part of the chain, and the motion of the carriage $p$ is reversed. This shifting of the latch from one side to the other can only take place when the rake has reached one or the other end of its stroke, as follows: The rake-arm $o$ is continued backward beyond the hub upon which it moves, and forms the curved arm $v$, and secured to the beam D is the spring-bar or latch $w$, which projects along and just above the bar I, and at the outer end curves slightly backward. At each end of the bar I, and in its upper edge, is a notch, $xx$. As the rake is drawn along the platform, sweeping the grain therefrom, and after the gavel has reached the edge thereof, the arm $v$ comes in contact with the bar $w$, and as the movement of the rake continues it is forced to rise up until the end of the arm $v$ has passed through the notch $x$ in that end of the bar I. The bar $w$ has been forced to yield a little in permitting the arm $v$ to pass through the notch $x$, and when the rake-arm has risen high enough to carry the weight at the end of the lever $r$ past a line perpendicular to its centre of motion it falls over upon the rear arm of the shifter $q$, and the movement of the carriage $p$ is reversed. The arm $v$ is now compelled by the bar $w$ to engage with the front edge of the bar I, because the elasticity of the bar $w$ is sufficient to prevent a return of said arm through the notch. The rake is therefore retained in the position shown in fig. 2 until the other end of the bar I is reached, when the notch $x$ there made permits the rake to fall again upon the platform, and this dropping movement depresses the forward arm of the shifter $q$, and again reverses the movement of the carriage. The weighted lever $r$ is also thrown forward by the dropping of the rake, and assists in retaining the rake upon the platform while moving the gavel. The spur-wheel $t$ is actuated by the pinion $y$, receiving motion from the gear-wheel $z$ on the main shaft, and transmitting the same through the shaft $a'$ and countershaft $b'$, with their bevel-gears, to the spur-wheel $t$. The pinion $y$ may be thrown in and out of gear with the wheel $z$ and the shaft $a'$ by the clutch-lever $c'$. The spring-fingers $d'd'd'$ attached to the beam D receive the gavel as it is swept from the platform, and, only yielding to the pressure of the rake J, insures the delivery of the gavel in a mass, and not in a scattered condition, as might otherwise be the case.

The tongue is connected to the front end of the main frame by a hinge-joint, and is also provided with a key and screw connection, by which it may be rendered rigid, and at any desired angle with the main frame. This key and screw connection is formed as follows: A screw-bolt, $e'$, flattened at one end, is inserted through a hole in the main frame A, and the nut $g'$ screwed on from the upper side of said frame. A key, $h'$, is inserted through both tongue and screw-head, as is shown in fig. 7, and the tongue is thereby rendered rigid, while at the same time it may be adjusted to any desired angle by raising or depressing the screw. The nut $g'$ has a cylindrical and a square portion, and is kept in contact with the frame A by the arm $z'$, which also retains the wrench $k'$ in place. The position of the wrench $k'$ may be changed upon the nut $g'$ by raising it from the square to the cylindrical portion of the said nut, when it may be moved forward or backward to gain a new hold, and the wrench will always be found in place, because the arm $i'$ prevents its entire disengagement from the nut.

Having described my invention, what I claim as new, and desire to secure by Letters Patent, is—

The combination of the plate M, block S, and arm Q, substantially as and for the purpose set forth.

Mounting the cutters, crank-shaft, and driving-pinion upon the coupling-plate M, as and for the purpose set forth.

The carriage $p$, in combination with the rod K, bar I, and endless chain L, all constructed as set forth.

The combination of the rake-arm $o$, shifter $q$, weighted lever $r$, and latch $u$ to change the connection from one part of the chain L to the opposite, and thereby reverse the motion of the rake, substantially as set forth.

The combination of the rake-arm $o$ with the curved arm $v$, the notched bar I, rod K, carriage $p$, and the spring-bar $w$, all constructed as and for the purpose set forth.

The open-head reel N, constructed with jointed arms and adjustable jointed blades, in the manner set forth, so as to permit the attendant to expand the same for the purpose of making it sweep nearer to or further from the platform and cutters, as set forth.

The movable head $h$, connected to the reel-arms by short arms $i$, and moved back and forth by the pinion $k$ and rack $l$, as and for the purpose set forth.

The bolt $e'$ with the nut $g'$, in combination with the hinged tongue C and pin $h'$, substantially as and for the purpose set forth.

Making the nut $g'$ with an angular portion, and a cylindrical portion, so that the wrench $k'$ may be shifted thereon without removing it entirely from the nut.

CHARLES G. MILLER.

Witnesses:
    THOS. G. PRINGLE,
    W. BROWN.